Sept. 4, 1928.  E. C. THOMPSON  1,682,812
FILM FEEDING MEANS FOR CAMERAS
Filed April 14, 1923   2 Sheets-Sheet 1
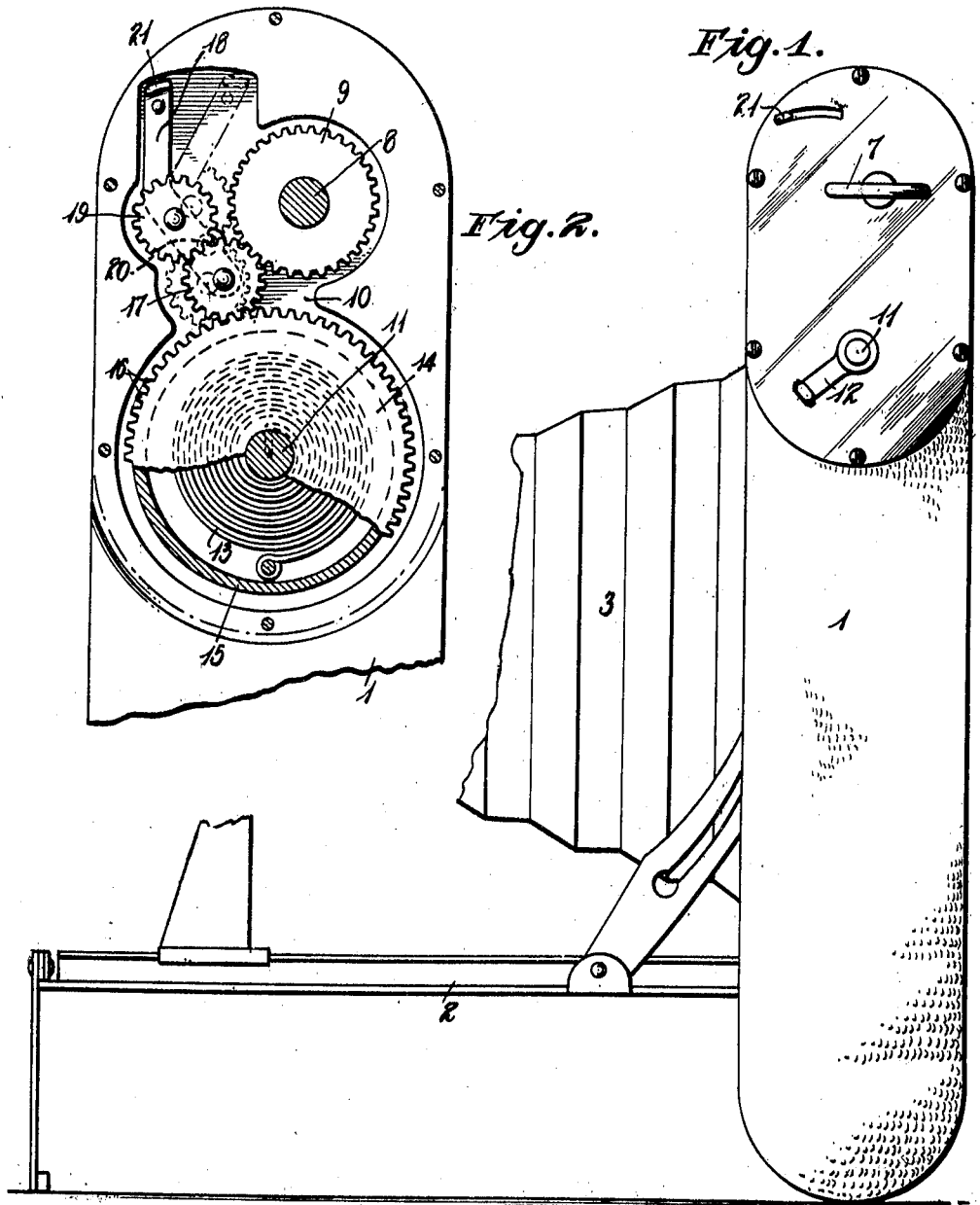

Sept. 4, 1928.   E. C. THOMPSON   1,682,812
FILM FEEDING MEANS FOR CAMERAS
Filed April 14, 1923    2 Sheets-Sheet 2
Fig. 3.
Fig. 4.
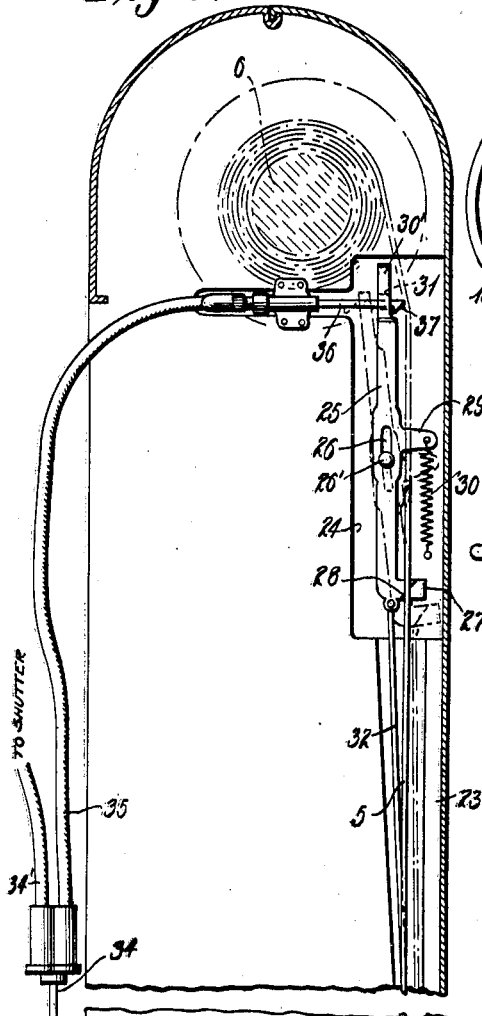
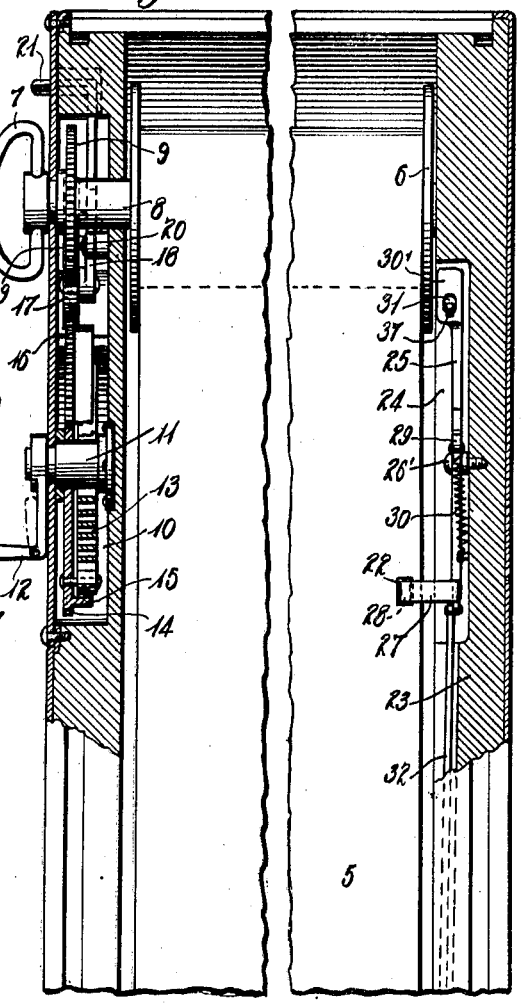
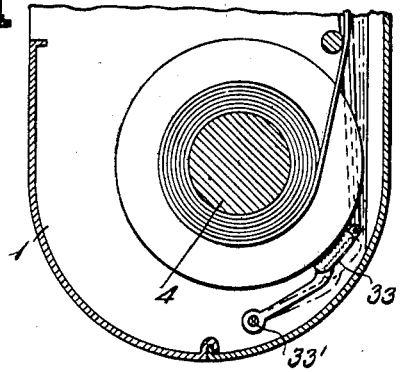
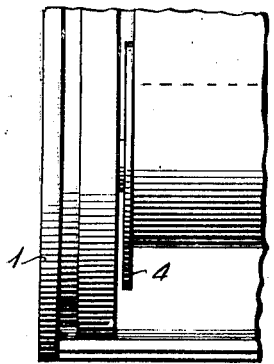
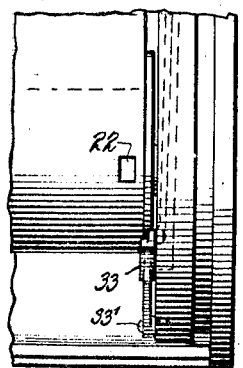
Eugene C. Thompson Inventor
By: Frank L. Belknap Attorney Patented Sept. 4, 1928.

1,682,812

UNITED STATES PATENT OFFICE.

EUGENE C. THOMPSON, OF LOS ANGELES, CALIFORNIA.

FILM-FEEDING MEANS FOR CAMERAS.

Application filed April 14, 1923. Serial No. 632,031.

The invention relates to improvements in a film controlling means for cameras of the roll film type adapted to automatically advance an unexposed portion or section of a film into exposure position after each operation of the lens shutter, thereby positively preventing two or more exposures from being made on the same section of a film.

It is a primary object of this invention to provide a film mechanism for a roll film, in which the operating spring for successively advancing the film sections after each operation of the shutter is operatively connected with the winding spool of the camera whereby this operating spring is completely wound during a manual operation of the winding spool when the blank or protecting portion of the film is being advanced to bring number 1 section to an exposure position. This construction makes it necessasry to fully wind the spring during the advancing of the blank or protecting portion of the film, so that said spring will have sufficient strength to successively advance the picture taking portions of the film after each exposure through reduction gearing cooperating with the winding roll, eliminating the liability of the spring running down or being of insufficient strength to advance the full series of picture taking sections of the film through the camera. The protecting or blank portion of a roll film is usually of a length substantially equal to the length of the sensitized portion thereof, and in automatic film advancers as heretofore used, it has been necessary to advance this entire film by the single spring, which I have discovered is objectionable because of the fact that a spring capable of being used in a camera will not have sufficient strength to move the film against its natural friction when said spring is geared sufficiently high with the winding reel to revolve said reel a sufficient number of times to wind the entire film. This difficulty I obviate by manually winding the blank portion of the film, at the same time winding the advancing spring, which spring later becomes operative to successively move the exposed portion of the film into different exposure positions.

It is a still further object of the invention to provide a means for automatically advancing the film after each exposure in which there is a most accurate control of the film, so that the successive sensitized sections are positively brought to rest in proper picture taking positions to prevent overlapping of exposures.

With the foregoing object in mind, I preferably control the advancing movement of the film by a trip or stop directly cooperating with the film or a part carried thereby, which trip engages perforations in said film and serves to arrest the movement thereof when a section has been placed in proper position for exposure. This trip furthermore actuates braking mechanism for providing an instantaneous stop for the film without danger of twisting, buckling, or breaking at the time the film is approaching and is in picture taking position.

The invention consists of further novel elements and combinations of parts, as will be more fully hereinafter described in the accompanying specification and disclosed in the drawings, in which:

Fig. 1 represents a side elevation of a camera with parts broken away,

Fig. 2 is a detail view of the motor mechanism for controlling the winding of the film, Fig. 3 is a vertical sectional view through a portion of the camera, Fig. 4 is a rear elevation with parts in section, and Fig. 5 is a detail view of the trip.

Referring now more particularly to the drawings, wherein like reference characters indicate corresponding parts, the numeral 1 designates a roll camera of the well known and conventional type. This camera has a folding front 2, and contains the usual bellows 3, at the forward end of which there is mounted the lens, shutter, and operating mechanism therefor. Inasmuch as the specific construction of the camera forms no material part of my invention, I will not describe the camera in detail, as it will be understood that the film advancing mechanism to be hereinafter described is capable of application to any of the well known cameras.

The camera at one end receives the spool 4 which contains a roll of film 5 which passes through the camera, one end of the film being wound upon the winding spool 6 as is usual in all roll types of cameras. The subject matter of this invention is the precise means for controlling and automatically advancing the film 5 through said camera, which means will now be described.

The winding drum 6 of the camera at its other end may receive a manually operable winding key 7, but inasmuch as this key is only used for emergency purposes, it does not necessarily form a material part of this invention. The winding drum 6, however, is provided with a shaft 8, on which there is mounted a gear 9 adapted to rotate therewith. To rotate this gear, the following mechanism is employed. In one side wall of the camera, I provide a cut-out portion or cavity 10, which is of sufficient size to receive all of the mechanism to be now described, so that none of this mechanism projects beyond the side walls of the usual roll camera. In a portion of this cavity 10 there is mounted a shaft 11 adapted to be rotated by a handle 12, the rotation of which winds a driving spring 13. This spring is fixed at one end to the camera wall, while the other end is attached to a gear wheel 14, which has a flange 15 adapted to partially enclose or surround the spring 13 to form a housing therefor, the periphery of the wheel having gear teeth 16 adapted to mesh with the teeth of gear 17 for transmitting motion to said spool 6. The usual roll film has a blank substantially equal to the length of the sensitized part of the film. For this reason, it is practically impossible to provide a winding spring of sufficient capacity, without being of such great size as to be objectionable, that will advance a full film through the camera, or in other words, completely unwind a film from the roll 4 onto the receiving spool 6. To transfer the winding motion of the gear wheel 14 operated by the handle 12 to advance the blank part of the film 5 without placing any work on the spring 13, I utilize in the gearing mechanism a reversing gear that is shifted into operation during such rotation of the handle 12, but which gear is placed out of operation when the sensitized sections of the film have been brought into picture taking position and are to be successively advanced by the spring motor 13 after each operation of the shutter. Meshing with the teeth 16 of the gear wheel, I provide a gear 17 journaled to an arm 18, the said gear 17 in turn meshing with a reversing gear 19, likewise journaled in said arm 18, which gear 19 at times meshes with the gear 9 on the winding spool 6 of the camera. The arm 18 is eccentrically mounted on a pivot pin 20, and has a forwardly extending part 21 which projects to the exterior of the camera. By shifting this arm to the dotted line position shown in Fig. 2, the gear 17 does not mesh with the gear 9, but does mesh with the teeth 16 on the gear 14 and with the reversing gear 19, which reversing gear in turn meshes with the teeth on the gear 9. To wind the spring 13 it is, of course, necessary to operate the handle 12, and the gear 14 likewise rotates. This winding movement of the gear is transmitted through the gears 17 and 19 to the gear 9 on the film winding spool, causing this spool to be rotated counter clockwise, whereby the blank or protecting portion of the film is wound upon the spool 6 by the manual operation of the handle 12, this operation at the same time completely winding the spring 13, which is to be later used in the successive advance of exposed sections of the film through the camera through the operation of a trip controlled by means operating with the shutter. The arm 18 for the gears 17 and 19 is so mounted that it is possible by shifting the lever 21 to an intermediate position to disengage the gear 17 from the gear 9 to permit of adjustments of either the gear 15 or the gear 9. The unused portion of the film is in this manner wound upon the winding spool 6, and a number 1 section of the sensitized film is brought into position. Each section of the sensitized portion of the film is preferably provided with an aperture 22 into which a trip device to be now described enters when a section is brought to exposure position. Assuming that a number 1 section of the film has been brought to exposure position, I then shift the lever 21 to the full line position shown in Fig. 2, at which time the gear 19 runs idle, there being a single gear 17 interposed between the gears 9 and 15. On the opposite side 23 of the camera, I form a pocket 24, and in this pocket I pivotally mount a trip lever 25. This lever has an elongated slit 26 therein receiving the pivot pin 26', and is capable of both a rocking and sliding movement on said pin. One end of the lever is provided with a U-shaped extension 27, having a pointed end 28, which is adapted to enter one of the openings 22 in the film as shown in Fig. 4 when a section of the film is in exposure position. Intermediate its ends, the lever 25 has a projecting arm 29 to which there is attached a spring 30 fastened at its opposite end to the side of the camera. The spring normally urges the lever 25 rearwardly, acting in opposition to the main spring 13. The spring, of course, tends to keep the pointed end 28 of the trip in contact with the surface of the film, and by employing the projecting arm 29 as soon as said pointed end reaches one of the openings in the film, it immediately drops therein and forms a stop for the film. The forward end of the trip is bent at an angle to the body portion thereof to provide a portion 30', having an aperture 31 therein.

The rear end of the trip 25 is pivotally connected to an operating wire 32, the end of said wire being in turn pivoted to a brake 33, which is attached to the side of the camera by the pin 33'. The brake 33 has a convenient form of braking surface that engages and rides on the upper edge of the spool 7 to arrest the movement of this spool when the brake is applied, this brake being applied at the time a sensitized section of the film is brought into exposure position and the trip 25 returned to its normal position.

If a sensitized section of the film has been brought to exposure position and a picture is to be taken, the shutter is operated by the double antinous release 34. One operating wire 34' from this release travels to the shutter, while the other operating wire 35 passes up through the camera and is provided with a resilient section 36, having a hooked end 37 that passes through the opening 31 in the trip 25. When the antinous release 34 is operated, the shutter is immediately released by the forward action of the operating wire 34', while the hooked end 37 of the operating wire 35 passes through the opening 31 in the trip 25, but does not shift this trip during this upward movement. This means that an exposure is taken before this trip is actuated. On the return movement of the wire 35, however, the hooked end 37 of the trip engages the upper surface of the portion 30' of the trip 25 and pulls this trip down to the dotted line position, as shown in Fig. 3. At this time the pointed end 28 of the trip is raised from its opening 22 in the film, and the spring 30 therefore moves the trip bodily in a rearward direction by reason of the elongated slot 26 therein, thus releasing the brake 33. As the film is no longer locked or held in an exposure position by the trip 25, the main spring 13 begins to operate the gear wheel 15, which in turn rotates the gear 17, meshing with the gear 9 on the winding spool 6, causing the film to be advanced or wound on this spool. This winding motion continues only to the extent of one sensitized section, for the reason that each sensitized section has its aperture 22, and the moment said aperture aligns with the pointed end 28 of the trip 25, the spring 30 immediately forces this pointed end into said aperture. After this engagement, the trip moves a slight distance along with the film, that is to say, the distance of the elongated slot 26, causing the brake 33 to be operated, but as soon as the limit of this movement is reached, the film, of course, can be moved no further, and a second sensitized section has been placed into exposure position.

One very important feature of this invention is the provision of the horizontal end 30' of the trip 25. It will be appreciated that when the antinous release wire 35 has been operated and has returned to its normal position, the trip 25 has been disengaged from its aperture in the film. At this time, the spring 30, of course, moves this trip bodily rearwardly, so that the flattened imperforated portion of the extension 35 of the trip 25 now overlies the hooked end 37 of the antinous release wire 35. Should the user of the camera attempt to take a picture during this time, the hooked end 37 would, of course, merely engage the under-side of the horizontal portion 30 of the trip, and this would prevent the shutter from being operated, thereby constituting a positive guard to prevent exposures from being taken before a proper section of the film has been brought to exposure position.

The operations hereinbefore described are continued until all of the picture taking sections of a film have been used, it being appreciated from the foregoing description that the sensitized sections are automatically and successively advanced after each exposure and that the movement of the film is controlled by apertures in by the film, so that each successive section must be exactly placed in exposure position before an exposure can be made.

It should of course be apparent to those skilled in the art that the present invention permits of an automatic stepping forward of the sensitized portion of the film to proper position, but obviously accomplishes this very much more rapidly than is practicable by the present method of manual winding of the film. For example it normally takes an average user of a roll film camera from ten to twenty seconds to wind the film to new exposure position. By means of the present invention the film is automatically wound to a new exposure position in a fraction of one second. From a practical standpoint this is a feature of prime importance. By far the greater majority of users of roll film cameras are relatively unskilled, and where it is desired to take two pictures in rapid succession not only are they unable to wind up the film to the next exposure position with sufficient rapidity and accuracy, but frequently fail to wind it at all, or wind it either too far or not far enough. The present invention obviates both difficulties in a simple and effective manner.

It will also be seen by reference to the drawings that the various operating mechanisms are inserted into the ordinary casing of a camera without substantially increasing the size of the camera. The advantage of this is too obvious for comment.

It is to be understood that by the term "camera" as used in the specification and claims I include any mechanism for photographing objects.

Having thus described my invention, what I claim is:

1. In a camera provided with lens and a shutter, the combination with a winding spool for receiving a film, manually operated means for winding the blank or protecting portion of the film upon said spool, spring actuated mechanism for automatically advancing the sensitized sections of the film, latch mechanism adapted to engage each sensitized section of the film to directly lock the same against movement, means for actuating the camera shutter, means operable simultaneously with the release of the shutter actuating means for releasing said latch mechanism and means associated with said latch mechanism for rendering said shutter operating means inoperative until said latching mechanism has assumed a locking position with respect to the next succeeding sensitized film section.

2. In a camera provided with a lens and shutter, the combination with a winding spool for receiving a film, of manually operated means for winding the blank or protecting portion of the film upon said spool, spring actuated means for automatically moving the sensitized sections of the film into exposure position, latch mechanism adapted to engage the film and directly lock it against movement by said spring actuated mechanism, said latch mechanism comprising a lever mounted on the camera frame adapted to have a limited sliding and swinging movement, means for actuating the camera shutter, means operable simultaneously with the releasing of the shutter actuating means for releasing said latch mechanism and means associated with said latch mechanism for rendering the shutter operating means inoperative until said latch mechanism has assumed a locking position with respect to the next successive sensitized section of the film.

3. A camera having a lens and shutter, means for automatically advancing each succeeding sensitized section into exposure position, latch mechanism adapted to directly lock each sensitized section of the film in exposure position, a brake associated with said latching mechanism, operating means for actuating the camera shutter, means operable upon the releasing of the shutter operating means to release said latch mechanism and the brake associated therewith and means associated with said latch mechanism for rendering said shutter operating means inoperative until said latch mechanism and brake member have returned to locking position with respect to the next succeeding sensitized film section.

In testimony whereof I affix my signature.

EUGENE C. THOMPSON.